(12) United States Patent
Hedouin et al.

(10) Patent No.: US 6,491,886 B1
(45) Date of Patent: Dec. 10, 2002

(54) METHOD FOR TREATING GASES TO REDUCE NITROGEN OXIDE EMISSIONS

(75) Inventors: Catherine Hedouin, Gouvieux (FR); Pierre Macaudiere, Anieres-sur-Seine (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/446,955

(22) PCT Filed: Jul. 1, 1998

(86) PCT No.: PCT/FR98/01410

§ 371 (c)(1),
(2), (4) Date: Apr. 19, 2000

(87) PCT Pub. No.: WO99/01216

PCT Pub. Date: Jan. 14, 1999

(30) Foreign Application Priority Data

Jul. 3, 1997 (FR) .......................................... 97 08422

(51) Int. Cl.⁷ ................................................. B01J 8/00
(52) U.S. Cl. ................................................. 423/239.1
(58) Field of Search ......................... 423/239.1, 239.2, 423/213.2

(56) References Cited

U.S. PATENT DOCUMENTS

| 4,102,819 A | 7/1978 | Petrow ...................... 252/460 |
| 4,176,089 A | 11/1979 | Cull .......................... 252/452 |
| 4,280,926 A | * 7/1981 | Abe et al. ................... 252/430 |
| 4,297,246 A | * 10/1981 | Cairns et al. ............... 252/465 |
| 4,793,980 A | * 12/1988 | Torobin .................... 423/213.5 |
| 5,162,283 A | 11/1992 | Moini ........................ 502/236 |
| 5,336,651 A | 8/1994 | Yoshimoto ................... 502/74 |
| 5,997,830 A | * 12/1999 | Itoh et al. ................. 423/213.5 |

OTHER PUBLICATIONS

Patent Abstracts of Japan, vol. 096, No. 001, Jan. 31, 1996 & JP 07 241466 A (Tokyo Gas Co Ltd), Sep. 19, 1995, see abstract.

Preliminary French Search Report, Oct. 1998.

* cited by examiner

*Primary Examiner*—Stanley S. Silverman
*Assistant Examiner*—Edward M. Johnson

(57) ABSTRACT

The present invention relates to a process for treating gases to reduce emissions of oxides of nitrogen. This process is of the type in which a catalytic composition is used which comprises a catalytic phase on a support and is characterized in that the support is based on silica and titanium oxide in an atomic proportion Ti/Ti+Si of between 0.1 and 15%. The process of the invention applies more particularly to the treatment of the exhaust gases from diesel engines or from lean burn engines.

14 Claims, No Drawings

METHOD FOR TREATING GASES TO REDUCE NITROGEN OXIDE EMISSIONS

This application is an application under 35 U.S.C. Section 371 of International Application Number PCT/FR98/01410, filed on Jul. 1, 1998.

The present invention relates to a process for treating gases to reduce emissions of oxides of nitrogen using a catalytic composition having a support based on silica and titanium oxide.

It is known that reducing emissions of oxides of nitrogen ($NO_x$) from the exhaust gases of car engines is carried out in particular using three-way catalysts which make stoichiometric use of the reductive gases present in the mixture. Any excess of oxygen is manifested in a drastic deterioration in the performance of the catalyst.

However, certain engines, such as diesel engines or lean-burn petrol engines (i.e. engines operating with a lean mixture) are economic on fuel but emit exhaust gases which permanently include a large excess of oxygen—at least 5%, for example. A standard three-way catalyst therefore has no effect on the $NO_x$ emissions of these engines. Nevertheless, limiting $NO_x$ emissions has become imperative owing to the more vigorous automotive post-combustion standards which now extend to this type of engine.

There is therefore a real need for an effective catalyst to reduce the $NO_x$ emissions for this type of engine and, more generally, for the treatment of gases containing $NO_x$. In addition, the aim is to obtain catalysts which are active at moderate temperature.

With this aim in mind, the process of the invention for treating gases to reduce the emissions of oxides of nitrogen is of the type which uses a catalytic composition comprising a catalytic phase on a support, and is characterized in that the support is based on silica and titanium oxide in an atomic proportion Ti/Ti+Si of between 0.1 and 15%.

Other characteristics, details and advantages of the invention will appear more completely on reading the following description as will various specific but non-limitative examples which are intended to illustrate it.

The principal characteristic of the catalytic composition used in the process of the invention is the support of this composition. This support is based on silica and titanium oxide in the specific proportion given above. In accordance with one embodiment this proportion can be between 1 and 10%.

It is advantageous to use supports which have a higher specific surface area and are thermally stable. It is therefore possible with advantage to use supports having a specific surface area of at least 350 $m^2/g$ and more particularly of at least 600 $m^2/g$ after calcination at 750° C. for 6 hours. By specific surface area here is meant the BET specific surface area determined by nitrogen adsorption in accordance with the standard ASTM D 3663-78 based on the method of Brunauer-Emmett-Teller described in the Journal of the American Chemical Society, 60 (1938) 309.

Supports with these surface values are generally of the mesoporous type; in other words, they have the characteristic of having a significant pore volume contributed by mesopores (pores of between 2 and 10 nm in diameter).

The support based on silica and titanium oxide can be prepared by any process capable of giving a support of sufficient specific surface area.

Mention may thus be made more particularly of a process of micellar texturing using, as silica source, organic compounds of silicium, especially alkyl silicates such as tetraethyl orthosilicate and making this silica source react with a titanium compound or source, in the presence of a surfactant. These organic compounds of silicium are generally employed in the form of solutions in alcohols, especially aliphatic alcohols. As titanium compound, organic titanium compound can be used such as alkyl or alkoxy titanates which are generally employed in the form of alcoholic solutions like the silicium compound. Concerning the surfactant, those of the type with active cation such as amides and quaternary ammonium salts may be employed more particularly. The reaction can be carried out by mixing the organic silicium compound and the titanium compound and by heating. The surfactant is subsequently added to the mixture thus heated. The precipitate obtained is separated from the reaction medium. This precipitate is subsequently calcined, generally in air, to give the support, which can subsequently be shaped. Calcination can be carried out in two stages. In the first stage calcination is carried out at a temperature sufficient to remove the surfactant. This temperature may be approximately 650° C. In the second stage, calcination is carried out at a temperature at least equal to that at which the catalyst will be used. This temperature may be approximately 750° C.

The support can be present in various shapes, such as pellets, beads, cylinders or honeycombs of variable dimensions.

By way of additives, the support may comprise one or more rare earth metal oxides. By rare earth metals are meant the elements of the group consisting of yttrium and the elements from the Periodic Table whose atomic number is from 57 to 71. As a rare earth metal more particular mention may be made of lanthanum. The additive content, expressed in atomic % of additive/Ti+Si+additive, can be not more than 20%, especially not more than 10%.

The catalytic composition of the invention may additionally comprise a catalytic phase. This phase can be based on at least one metal chosen from the elements of groups IIIA to IIB of the Periodic Table.

More particularly, the catalytic phase is based on at least one metal chosen from the metals of group VIII of the Periodic Table.

The Periodic Table of the Elements to which reference is made is that published in the supplement to the Bulletin de la Société Chimique de France No. 1 (January 1966).

By way of examples of metals which can be used in the catalytic phase mention may be made of platinum, palladium, rhodium, ruthenium and iridium. Mention may also be made of iron, copper and chromium and of vanadium, niobium, tantalum, molybdenum and tungsten.

The metal content of the catalytic phase and the metal content, especially the platinum content, of the composition can vary within wide proportions. This proportion, expressed as weight of metal relative to weight of support, is commonly between 500 and 40,000 ppm, preferably between 2500 and 20,000 ppm and especially between 5000 and 15,000 ppm.

The catalytic phase can be deposited on the support, preferably the calcined support, by any known technique.

It is therefore possible to use the impregnation technique, by soaking the support in a solution or a sol of the element or elements which makes up or make up the catalytic phase and then removing the excess solution or sol by draining or by passage in a rotary evaporator.

In the particular case of a catalytic phase based on platinum and in accordance with one variant of the invention, the platinum is provided in the form of a sol. The platinum sol will preferably be chosen so that it has a colloidal size of between 2 nm and 10 nm and more particularly between 3 nm and 8 nm. The colloidal size is determined by transmission electron microscopy (TEM).

According to one particular variant, impregnation is carried out "dry"; in other words, the total volume of solution or sol used is approximately equal to the total pore volume developed by the support to be impregnated. As far as the determination of this pore volume is concerned, it can be carried out by the known method of mercury porosimetry or else by measuring the quantity of water absorbed by a sample.

Following impregnation, the support is dried if appropriate and then calcined. Drying is usually carried out in air at a temperature which may vary between 80 and 300° C. and is preferably chosen between 100 and 150° C. Drying is continued until a constant weight is obtained. In general, the duration of drying is between 1 and 24 hours. Calcination of the support with the deposited active or catalytic phase is generally carried out at a temperature of not more than 750° C. and, more particularly, not more than 550° C. in the case where platinum is used in the catalytic phase. The duration of calcination can vary within wide limits and is, for example, between 1 and 24 hours, preferably between 2 and 10 hours. Calcination is generally carried out in air, although a calcination performed, for example, under inert gas is not of course excluded.

It is also possible to carry out calcination in a water/nitrogen mixture (10% by volume of water in nitrogen, for example). In this case, calcination is carried out at a temperature of not more than 850° C. and, preferably, of approximately 750° C. This treatment allows the composition to be activated, and is particularly advantageous in the case of a composition whose catalytic phase comprises platinum.

In the particular case of a composition whose catalytic phase is based on platinum provided by a sol, with a mesoporous support and with the specific surface area values given above, the size of the particles of platinum in the composition following calcination is substantially identical to the abovementioned colloidal size.

The catalytic phase can also be deposited by atomization. In this case, the support—in the form, for example, of a suspension—is introduced into a solution or a sol of the element or elements which makes up or make up the catalytic phase and the resulting mixture is dried by atomization (spray-drying). It is possible to operate with a gas outlet temperature of between 100 and 150° C. Subsequently, calcination is carried out under the conditions described above.

The compositions as described above are employed for the treatment of gases which may comprise oxides of nitrogen in combination, if appropriate, with oxides of carbon and/or hydrocarbons, with a view to reducing, in particular, the emissions of oxides of nitrogen.

Gases suitable for being treated by the present invention are, for example, those obtained from gas turbines, from boilers of thermal power stations or else from internal-combustion engines. In the latter case, these engines can in particular be diesel engines or lean burn engines.

The invention also applies to the treatment of gases which have a high content of oxygen and which include oxides of nitrogen, with a view to reducing the emissions of these oxides. By gases having a high content of oxygen are meant gases having an excess of oxygen relative to the amount required for stoichiometric combustion of the fuels and, more precisely, gases permanently having an excess of oxygen relative to the stoichiometric value $\lambda=1$. The value $\lambda$ is correlated with the air/fuel ratio in a manner known per se especially in the field of internal-combustion engines. In other words, the invention applies to the treatment of gases from systems of the type described in the preceding paragraph which function permanently under conditions such that $\lambda$ is always strictly greater than 1. In the case of gases having a high content of oxygen the invention thus applies firstly to the treatment of gases from lean burn engines, which have an oxygen content (expressed by volume) of generally between 2.5 and 5% and, secondly, to the treatment of gases which have an even higher content of oxygen, for example gases from diesel-type engines, in other words of at least 5% or more than 5%, more particularly at least 10%, this content being able to be, for example, between 5 and 20%.

The gases may include hydrocarbons and, if so, one of the reactions it is sought to catalyse is the reaction HC (hydrocarbons)+$NO_x$.

The hydrocarbons which can be used as a reducing agent for removing the $NO_x$ are, in particular, the gases or liquids from the classes of saturated carbons, ethylenic carbons, acetylenic carbons, aromatic carbons and hydrocarbons from petroleum cuts, such as, for example, methane, ethane, propane, butane, pentane, hexane, ethylene, propylene, acetylene, butadiene, benzene, toluene, xylene, kerosene and gas-oil.

The gases may also include as reducing agent organic compounds containing oxygen. These compounds can be, in particular, alcohols, for example saturated alcohols, such as methanol, ethanol or propanol; ethers, such as methyl ether or ethyl ether; and esters, such as methyl acetate, and ketones.

The invention also applies to the treatment of gases containing neither hydrocarbons nor organic compounds as reducing agent.

The invention also relates to a catalytic system for the treatment of gases with a view to reducing emissions of oxides of nitrogen, which gases may be of the type mentioned previously. This system is characterized in that it comprises a catalytic composition as described above.

In this system, the catalytic composition can be in various forms, such as pellets, beads, cylinders or honeycombs of variable dimensions.

The compositions can also be used in catalytic systems comprising a coating (wash coat) incorporating these compositions, the coating being disposed on a substrate of the metal monolith type, for example, or on a ceramic substrate.

The systems are installed in a known manner in the exhaust pipes of vehicles in the case of their application to the treatment of exhaust gases.

The invention also relates, finally, to the process for producing the abovementioned catalytic systems, employing a catalytic composition of the type described above.

Examples will now be given.

EXAMPLES

I—Synthesizing the Catalysts

Starting Materials

A platinum solution of type $H_2PtCl_6$ (24.88% Pt) and a platinum sol of a colloidal size of 5–7 nm and a concentration of 10 g/l are used.

The sol is obtained by refluxing a solution comprising a mixture of polyvinylpyrrolidone, $H_2PtCl_6$ and methanol.

The support used has an atomic proportion Ti/Ti+Si of 9% and is prepared as follows:

First of all, 1 mol of tetraethyl orthosilicate (TEOS) is diluted in 6.54 mol of ethanol and 0.1 mol of titanium alkoxide $Ti(i-C_3H_7O)_4$ in 1.99 mol of isopropanol.

In a reactor fitted with a stirrer, the solution of titanium alkoxide is added rapidly with vigorous stirring to the solution of TEOS. A clear solution is then obtained which is heated at 72° C. with stirring for 3 hours.

In parallel, a solution containing 0.27 mol of dodecylamine (DDA) and 21.2 mol of water is prepared.

The solution containing the mixture of TEOS and Ti(i-$C_3H_7O)_4$ is then added to the solution containing the DDA surfactant. The resulting mixture is held at room temperature for 18 hours with vigorous stirring.

The surfactant is removed by calcining the resulting precipitate in air at a temperature of 650° C. for 4 hours. The precipitate is subsequently calcined in air at 750° C. for 4 hours (rate of temperature increase 1° C./min).

The support prepared in this way is impregnated dry within platinum in proportions of 1 or 2% by weight. The impregnated support is oven-dried at 110° C. for 2 hours and then calcined under conditions indicated in the table below.

| | | | Products obtained | |
|---|---|---|---|---|
| Product | % of Pt* | Source of Pt | Calcination after impregnation | Surface area** |
| 1 | 1 | solution | 2h 500° C. | 800 m²/g |
| 2 | 1 | sol | " | 750 m²/g |
| 3 | 2 | sol | " | 750 m²/g |
| 4 | 2 | sol | 6h 850° C. under 10% $H_2O$—$N_2$ | 370 m²/g |
| 5 | 1 | sol | 6h 750° C. under 10% $H_2O$—$N_2$ | 660 m²/g |

*The % of Pt is expressed as weight of metal relative to weight of support.
**The specific surface area is determined by the BET measurement.

II—Catalytic Tests

A quartz reactor is charged with 50 mg of powdered catalyst. The powder used has been granulated beforehand to 0.125 and 0.250 mm.

On entering the reactor, the reaction mixture has the following composition (by volume):

NO=300 vpm
$C_3H_6$=300 vpm
CO=350 vpm
$O_2$=10%
$CO_2$=10%
$H_2O$=10%
$N_2$=qsp 100%

The total flow rate is 30 l/h (s.t.p.).

The HSV is approximately 500,000 $h^{-1}$.

For the tests carried out in the absence of reducing agent, the flows of CO and $C_3H_6$ are suppressed and replaced by an equivalent flow of nitrogen so as to preserve the same HSV.

The signals of HC($C_3H_6$), CO and $NO_x$ ($NO_x$=NO+$NO_2$) are recorded permanently as is the temperature in the reactor.

The HC signal is given by a Beckman detector of the total hydrocarbons type, which is based on the principle of detection by flame ionization.

The $NO_x$ signal is given by an Ecophysics $NO_x$ analyser, which is based on the principle of chemiluminescence.

The CO and $N_2O$ signal is given by a Rosemount infrared analyser.

The catalytic activity is measured from the HC($C_3H_6$), CO and $NO_x$ signals as a function of the temperature in the course of a programmed temperature rise from 150 to 700° C. at a rate of 15° C./minute and on the basis of the following relationships:

The degree of conversion of HC(THC) in %, which is given by:

$$T(HC)=100(HC°=HC)/HC°$$

where HC° is the HC signal at time t=0, which corresponds to the HC signal obtained with the reaction mixture obtained when the catalytic reactor is bypassed, and HC is the HC signal at time t.

The degree of conversion of CO(TCO) in %, which is given by:

$$T(CO)=100(CO°-CO)/CO°$$

where CO° is the CO signal at time t=0, which corresponds to the CO signal obtained with the reaction mixture obtained when the catalytic reactor is bypassed, and CO is the CO signal at time t.

The degree of conversion of $NO_x$($TNO_x$) in %, which is given by:

$$T(NO_x)=100(NO_x°-NO_x)/CO_x°$$

where $NO_x°$ is the $NO_x$ signal at time t=0, which corresponds to the $NO_x$ signal obtained with the reaction mixture obtained when the catalytic reactor is bypassed, and $NO_x$ is the $NO_x$ signal at time t.

Owing to the fact that the catalysts may become activated under the test conditions, the catalytic activity is given in the course of the second consecutive test passage under the same conditions.

Example 1

Product 1 (catalyst used for reducing $NO_x$) is used. The results are given in Table 1 below.

TABLE 1

| Temperature (°C.) | $T_{CO}$ (%) | | $T_{HC}$ (%) | | $T_{NOx}$ (%) | |
|---|---|---|---|---|---|---|
| | 1st test | 2nd test | 1st test | 2nd test | 1st test | 2nd test |
| 200 | 35.2 | 53.9 | 1.2 | 2.1 | 0.2 | 0.9 |
| 250 | 72.3 | 83.9 | 38.3 | 60.6 | 9.4 | 18.9 |
| 300 | 97.9 | 97.9 | 98.5 | 100 | 15.9 | 45.4 |
| 350 | 100 | 100 | 100 | 100 | 15.9 | 38.0 |
| 400 | 100 | 100 | 100 | 100 | 20.9 | 27.9 |
| 450 | 100 | 100 | 100 | 100 | 18.2 | 16.9 |
| 500 | 100 | 100 | 100 | 100 | 10.5 | 8.8 |
| 550 | 100 | 100 | 100 | 100 | 4.7 | 4.1 |
| 600 | 100 | 100 | 100 | 100 | 1.7 | 1.3 |
| 650 | 100 | 100 | 100 | 100 | 0.9 | 0.9 |
| 700 | 100 | 100 | 100 | 100 | 0.2 | 0 |

Example 2

Product 1 is used but with a gas mixture which no longer includes CO or $C_3H_6$ (catalyst used for direct decomposition). The results are given in Table 2 below.

TABLE 2

| | $T_{NOx}$ (%) | |
|---|---|---|
| Temperature (° C.) | 1st test | 2nd test |
| 200 | 0 | 2.5 |
| 250 | 0 | 11.7 |
| 300 | 0 | 25.3 |

TABLE 2-continued

| Temperature (° C.) | $T_{NOx}$ (%) 1st test | 2nd test |
|---|---|---|
| 350 | 3.0 | 31.7 |
| 400 | 7.9 | 25.3 |
| 450 | 12.3 | 15.2 |
| 500 | 10.6 | 8.0 |
| 550 | 5.2 | 3.4 |
| 600 | 2.2 | 1.6 |
| 650 | 1.3 | 0.7 |
| 700 | 1.7 | 0.7 |

Example 3

Product 2 (catalyst used for reducing $NO_x$) is used. The results are given in Table 3 below.

TABLE 3

| Temperature (° C.) | $T_{CO}$ (%) 1st test | 2nd test | $T_{HC}$ (%) 1st test | 2nd test | $T_{NOx}$ (%) 1st test | 2nd test |
|---|---|---|---|---|---|---|
| 200 | 76.0 | 71.2 | 40.2 | 24.8 | 13.3 | 9.4 |
| 250 | 97.3 | 96.7 | 98.2 | 97.8 | 51.9 | 50.3 |
| 300 | 100 | 100 | 100 | 100 | 46.6 | 47.1 |
| 350 | 100 | 100 | 100 | 100 | 36.6 | 36.5 |
| 400 | 100 | 100 | 100 | 100 | 25.0 | 25.9 |
| 450 | 100 | 100 | 100 | 100 | 14.8 | 16.1 |
| 500 | 100 | 100 | 100 | 100 | 7.4 | 8.6 |
| 550 | 100 | 100 | 100 | 100 | 2.8 | 4.2 |
| 600 | 100 | 100 | 100 | 100 | 1.3 | 1.9 |
| 650 | 100 | 100 | 100 | 100 | 0.6 | 1.5 |
| 700 | 100 | 100 | 100 | 100 | 0.2 | 0.7 |

Example 4

Product 2 is used but with a gas mixture which no longer includes CO or $C_3H_6$ (catalyst used for direct decomposition). The results are given in Table 4 below.

TABLE 4

| Temperature (° C.) | $T_{NOx}$ (%) 1st test | 2nd test |
|---|---|---|
| 200 | 3.4 | 5.6 |
| 250 | 18.6 | 20.8 |
| 300 | 29.9 | 35.9 |
| 350 | 33.6 | 35.4 |
| 400 | 25.4 | 26.1 |
| 450 | 14.4 | 15.8 |
| 500 | 6.7 | 7.9 |
| 550 | 2.6 | 2.9 |
| 600 | 0 | 0 |
| 650 | 0 | 0 |
| 700 | 0 | 0 |

Example 5

Product 3 (catalyst used for reducing $NO_x$) is used. The results are given in Table 5 below.

TABLE 5

| Temperature (° C.) | $T_{CO}$ (%) 1st test | 2nd test | $T_{HC}$ (%) 1st test | 2nd test | $T_{NOx}$ (%) 1st test | 2nd test |
|---|---|---|---|---|---|---|
| 200 | 81.9 | 82.5 | 41.8 | 27.0 | 17.2 | 10.5 |
| 250 | 96.6 | 95.8 | 97.2 | 95.4 | 54.2 | 52.8 |
| 300 | 100 | 100 | 100 | 100 | 48.7 | 49.3 |
| 350 | 100 | 100 | 100 | 100 | 36.8 | 37.4 |
| 400 | 100 | 100 | 100 | 100 | 25.0 | 25.2 |
| 450 | 100 | 100 | 100 | 100 | 14.2 | 14.8 |
| 500 | 100 | 100 | 100 | 100 | 7.0 | 7.3 |
| 550 | 100 | 100 | 100 | 100 | 2.3 | 3.8 |
| 600 | 100 | 100 | 100 | 100 | 0.3 | 1.1 |
| 650 | 100 | 100 | 100 | 100 | 0 | 0 |
| 700 | 100 | 100 | 100 | 100 | 0 | 0 |

Example 6

Product 4 is used but with a gas mixture which no longer includes CO or $C_3H_6$ (catalyst used for direct decomposition). The results are given in Table 6 below.

TABLE 6

| Temperature (° C.) | $T_{NOx}$ (%) 1st test | 2nd test |
|---|---|---|
| 200 | 7.9 | 9.6 |
| 250 | 25.4 | 27.5 |
| 300 | 35.7 | 38.2 |
| 350 | 32.1 | 34.0 |
| 400 | 23.1 | 22.7 |
| 450 | 12.9 | 13.8 |
| 500 | 6.8 | 7.2 |
| 550 | 3.7 | 3.0 |
| 600 | 1.4 | 1.9 |
| 650 | 0.1 | 1.3 |
| 700 | 0.1 | 1.2 |

Example 7

Prduct 5 is used but with a gas mixture which no longer includes CO or $C_3H_6$ (catalyst used for direct decomposition). The results are given in Table 7 below.

TABLE 7

| Temperature (° C.) | $T_{NOx}$ (%) 1st test | 2nd test |
|---|---|---|
| 200 | 2.1 | 2.3 |
| 250 | 8.4 | 13.6 |
| 300 | 22.5 | 25.7 |
| 350 | 29.9 | 29.8 |
| 400 | 23.9 | 23 |
| 450 | 15.6 | 13.6 |
| 500 | 8.4 | 6.3 |
| 550 | 4.2 | 2.8 |
| 600 | 2.9 | 0.9 |
| 650 | 2.3 | 0.9 |
| 700 | 0.9 | 0 |

Example 8, Comparative

A catalytic composition is used which is based on platinum on a titanium support comprising lanthanum. The composition is obtained by dry impregnation with the abovementioned platinum sol of a titanium oxide comprising 10% by weight of lanthanum oxide ($S_{BET}$=80 m²/g)

which has been precalcined at 750° C. for 2 h. Impregnation is followed by oven-drying (110° C., 2 h), and by a calcination at 500° C. for 2 h with a temperature rise of 1° C./min. The platinum content is 1%. The catalyst thus prepared is used for reduction under the abovementioned conditions. The results are given in Table 8 below.

TABLE 8

| Temperature (° C.) | $T_{CO}$ (%) | $T_{HC}$ (%) | $T_{NOx}$ (%) |
|---|---|---|---|
| 200 | 32.1 | 1.2 | 0 |
| 250 | 84.1 | 71.6 | 28 |
| 300 | 98.8 | 99.4 | 41.6 |
| 350 | 100 | 100 | 35.20 |
| 400 | 100 | 100 | 24.3 |
| 450 | 100 | 100 | 14.3 |
| 500 | 100 | 100 | 7.7 |
| 550 | 100 | 100 | 3.1 |
| 600 | 100 | 100 | 1 |
| 650 | 100 | 100 | 0 |
| 700 | 100 | 100 | 0 |

A maximum $T_{NOx}$ of 41.6% is obtained at 300° C.

The examples above show that the composition according to the invention makes it possible to obtain catalytic activity within a temperature window of from 250 to 400° C. In addition, the compositions obtained from a platinum sol and used in the presence of a reducing agent are able to show increased and maximum catalytic activity from 250° C., this activity being manifested from the first passage onwards.

What is claimed is:

1. A process for treating gases to reduce emissions of oxides of nitrogen, comprising the steps of:
   a) treating said gases with a catalytic composition comprising a catalytic phase on a support, said support comprising silica and titanium oxide in an atomic proportion Ti/Ti+Si of between 0.1 and 15%, and being obtained by reacting an alkyl silicate with an alkyl or alkoxy titanate in the presence of a surfactant.

2. A process according to claim 1, wherein said proportion is between 1 and 10%.

3. A process according to claim 2, wherein the catalytic phase comprises at least one metal of groups IIIA to IIB of the Periodic Table.

4. A process according to claim 3, wherein the catalytic phase comprises at least one metal of group VIII of the Periodic Table.

5. A process according to claim 4, wherein the metal is platinum.

6. A process according to claim 5, wherein the platinum is obtained from a sol.

7. A process according to claim 6, wherein the sol has a colloidal size of between 2 nm and 10 nm.

8. A process according to claim 7, wherein the colloidal size is of between 3 nm and 8 nm.

9. A process according to claim 1, wherein the support has a specific surface area of at least 350 m$^2$/g after calcination at 750° C. for 6 hours.

10. A process according to claim 9, wherein the support has a specific surface area of at least 600 m$^2$/g.

11. A process according to claim 1, wherein the support further comprises one or more rare earth metal oxides.

12. A process according to claim 1, wherein the gas treated is an exhaust gas from diesel engines or from lean burn engines.

13. A process according to claim 1, wherein the gases have an oxygen content of at least 5% by volume.

14. A process according to claim 1, wherein step a) is carried out in the presence of a hydrocarbon or an organic compound containing oxygen.

* * * * *